(12) United States Patent
Matviya (10) Patent No.: US 7,767,183 B2
(45) Date of Patent: Aug. 3, 2010

(54) PRODUCTION OF CARBON FOAM FROM COALS

(75) Inventor: Thomas M. Matviya, McKees Rocks, PA (US)

(73) Assignee: Touchstone Research Laboratory, Ltd., Triadelphia, WV (US)

( * ) Notice: Subject to any disclaimer, the term of this patent is extended or adjusted under 35 U.S.C. 154(b) by 0 days.

(21) Appl. No.: 11/561,521

(22) Filed: Nov. 20, 2006

(65) Prior Publication Data

US 2007/0202034 A1 Aug. 30, 2007

Related U.S. Application Data

(63) Continuation-in-part of application No. 11/393,308, filed on Mar. 30, 2006.

(51) Int. Cl.
*C01B 31/00* (2006.01)
*C01B 31/02* (2006.01)
*C01B 31/04* (2006.01)
*C09C 1/56* (2006.01)
*C10L 5/00* (2006.01)

(52) U.S. Cl. .................. 423/445 R; 423/448; 423/460; 264/29.6; 264/29.7; 44/620

(58) Field of Classification Search ............. 423/445 R, 423/414, 439, 448, 460; 44/620; 264/29.1, 264/29.6, 29.7
See application file for complete search history.

(56) References Cited

U.S. PATENT DOCUMENTS

| 6,656,238 B1 * | 12/2003 | Rogers et al. | ................. 44/620 |
| 6,797,251 B1 * | 9/2004 | Bennett et al. | .......... 423/445 R |
| 6,833,011 B2 * | 12/2004 | Rogers et al. | ................. 44/607 |
| 2003/0070364 A1 * | 4/2003 | Rogers et al. | ................. 51/307 |

* cited by examiner

*Primary Examiner*—Karl E Group
*Assistant Examiner*—Noah S Wiese
(74) *Attorney, Agent, or Firm*—Philip D. Lane (57) ABSTRACT

Methods for the production of carbon foam from swelling coals that do not require the use of high process pressures, oxidized coal, devolatized coal, or high-strength, foam expansion confining molds are described. In some embodiments, a comminuted swelling bituminous coal is heated to a first elevated temperature sufficient to result in the coal particles softening and melting together to form a substantially homogeneous open cell plastic carbon material. The substantially homogeneous open cell plastic carbon material may then be heated to a second elevated temperature at a slow rate to form carbon foam. In some embodiments, the resulting carbon foam may be heated to a higher third elevated temperature. The resulting carbon foam may be subsequently heated to elevated temperatures as great as 3200° C. or more.

11 Claims, 2 Drawing Sheets

PRODUCTION OF CARBON FOAM FROM COALS

CROSS-REFERENCE TO RELATED APPLICATIONS

This application is a continuation-in-part of U.S. patent application Ser. No. 11/393,308, filed Mar. 30, 2006 entitled "High Density Carbon Foam", which is based on U.S. Provisional Patent Application No. 60/594,355, filed on Mar. 31, 2005, and which both applications are herein specifically incorporated by reference in their entireties.

STATEMENT OF FEDERALLY SPONSORED RESEARCH OR DEVELOPMENT

This invention was made with Government support under contract W9113M-05-C-0125 awarded by the U.S. Army Space and Missile Defense Command. The Government has certain rights in the invention.

BRIEF SUMMARY OF THE INVENTION

Methods for the production of carbon foam from swelling coals that do not require the use of high process pressures, oxidized coal, devolatized coal, or high-strength, foam expansion confining molds are described. In some embodiments, a method for producing carbon foam, may comprise the steps of heating comminuted coal to a first elevated temperature sufficient to form a substantially homogeneous, plastic open cell carbon material, where the comminuted coal forms a coke when heated to about 510° C. at a rate of about 2° C./min. The substantially homogeneous plastic open cell carbon material may be heated to a second elevated temperature sufficient to form a carbon foam. The carbon foam is substantially free to expand in at least one direction during formation, and according certain embodiments, the heating is conducted at about 0 psig.

Some embodiments may comprise the steps of heating comminuted coal to a temperature and at a rate sufficient to form carbon foam having a density ranging from about 0.1 to about 0.8 g/cc, where said heating is conducted in an essentially inert atmosphere having a pressure of about 0 psig, the comminuted coal forms a coke when heated to about 510° C. at a rate of about 2° C./min, and the carbon foam is substantially free to expand in at least one direction during formation of carbon foam.

DETAILED DESCRIPTION OF CERTAIN EMBODIMENTS OF THE INVENTION

Carbon foams are materials of very high carbon content that have appreciable void volume. In appearance, excepting color, carbon foams resemble some readily available commercial plastic foams. As with plastic foams, the void volume of carbon foams is located within numerous empty cells. The boundaries of these cells are defined by the carbon structure. These cells typically approximate ovoids of regular, but not necessarily uniform, size, shape, distribution, and orientation. The void volumes in these cells may directly connect to neighboring void volumes. Such an arrangement is referred to as an open-cell foam. The carbon in these foams forms a structure that is continuous in three dimensions across the material. Typically, the cells in carbon foams are of a size that is readily visible to the unaided human eye. Also, the void volume of carbon foams is such that it typically occupies much greater than one-half of the carbon foam volume.

The regular size, shape, distribution, and orientation of the cells within carbon foam readily distinguish this material from other carbon materials such as metallurgical cokes. The void volumes within cokes are contained in cell-like areas of typically ovoid shape and random size, distribution, and orientation. That is, in cokes, some void volumes can be an order of magnitude, or more, larger than others. It is also not uncommon that the over-lapping of void volumes in cokes results in significant distortions in the void shape. These distortions and large void volumes can even lead to a product that has limited structural integrity in all except smaller product volumes. That is, it is not uncommon for coke to be friable and larger pieces of coke to readily break into smaller pieces with very minimal handling. Such breakage is typically not exhibited by carbon foams. Also, a given sample of coke can exhibit both open and closed-cell void volumes.

Carbon foams have potential utility in a variety of applications as a result of their unique properties such as temperature resistance, strength, and low density. For example, carbon foams are typically fire resistant and may exhibit significant strength, even at extreme temperatures, which makes these materials suitable for use as lightweight thermal barriers, wall panels, and as baffles for high intensity flames. These materials may also function as filter media for the removal of gross solid contaminates from molten metals.

Carbon foams have been produced from various materials including, but not limited to, pitches, mesophase carbon materials, foamed synthetic plastics, coals, hydrogenated coal products, solvent refined coals, and coal extracts. The processes used to produce these carbon foams have been as varied as the starting materials to these processes.

Coal is a relatively inexpensive and relatively non-toxic starting material for the production of carbon products. Such products have included metallurgical cokes, activated carbons, and carbon foams. Specifically, swelling bituminous coals are typically used in the production of metallurgical cokes due to the fact that these coals typically "swell" upon heating to produce a porous carbon mass. This porous carbon mass is referred to as a coke. As described above, the void volume within coke is not arranged in cells having the regular size, shape, distribution, and orientation of the cells within carbon foam. As a result, coke does not have the combination of beneficial properties exhibited by carbon foams. Therefore coke has limited, if any, utility in the applications to which carbon foams may be directed.

A number of processes are known which control the swelling behavior of bituminous coals such that carbon foams, rather than cokes, are produced. For example, carbon foams have been produced from swelling bituminous coals using processes where the coal is foamed under high process atmospheric pressures. In other processes, the coal is oxidized or devolatized prior to foaming. In still other process, the coal is foamed in a high-strength mold which, apparently, mechanically limits the maximum carbon foam volume, and possibly pressurizes, the swelling coal under what otherwise may be coke forming conditions.

The present invention provides a method for the production of carbon foam from swelling coals that does not require the use of high process pressures, oxidized coal, devolatized coal, or high-strength molds. In some embodiments, the method of the present invention entails heating a comminuted swelling bituminous coal to a first elevated temperature sufficient to result in the coal particles softening and melting together to form a substantially homogeneous open cell, plastic carbon material. As used herein, "homogeneous open cell plastic carbon material" includes deformable carbon materials having numerous void volumes of substantially uniform size and distribution which are in mutual communication with each other throughout the material. The homogeneous open cell plastic carbon material may be porous or contains open cells throughout the material. The substantially homogeneous open cell plastic carbon material is then heated to a second elevated temperature at a slow rate to convert the substantially homogeneous open cell plastic carbon material into carbon foam. In some embodiments, the resulting carbon foam may be heated to a higher third elevated temperature. The resulting carbon foam may be subsequently heated to elevated temperatures as great as 3200° C. or more.

In some embodiments, the carbon foams produced by this method, after heating to temperatures greater than about 950° C., may have densities between about 0.3 g/cc and about 1 g/cc. In other embodiments, the density of the carbon foams may be from about 0.4 g/cc to about 0.8 g/cc. In still other embodiments, the density of the carbon foams may be from about 0.5 g/cc to 0.7 g/cc. In some embodiments, the crush strength, i.e., compressive strength as determined by ASTM C365, of the carbon foams produced by this method, after heating to a temperature greater than about 950° C., may be as great as about 4900 lbs/in$^2$ or more at a density of about 0.7 g/cc. The body of these carbon foams may be largely isotropic.

The carbon foam of the present invention is prepared directly from comminuted coal. In some embodiments, the size of the comminuted coal particles may range from about 0.020 mm (or less) to about 0.5 mm. In certain embodiments, the coal is comminuted to a size such that essentially all of the coal will pass through an 80 mesh screen (U.S. Standard Sieve Series). Such 80 mesh screens have openings of about 0.18 mm. In other embodiments, the coal is comminuted to a size such that essentially all of the coal will pass through a 140 mesh screen (U.S. Standard Sieve Series). Such 140 mesh screens have openings of about 0.105 mm. In still other embodiments, suitable coals comminuted to other mesh sizes may be utilized. In various embodiments, the coal may be comminuted to sizes below about 0.42 mm, in other embodiments below about 0.18 mm, and in yet other embodiments below about 0.105 mm. In some embodiments, coals comminuted to larger particle size distributions will provide carbon foams having larger cell sizes. In other embodiments, coals comminuted to smaller particle size distributions will provide carbon foams having smaller cell sizes. Suitable comminuted coals are those coals that, when comminuted, form a coke when heated to about 510° C. at a rate of about 2° C./min. Such coals may be referred to as swelling coals. Suitable coals may include, but are not limited to, Low Volatile, Medium Volatile, High Volatile A, High Volatile B, and High Volatile C bituminous coals. Suitable coals may include blends of coals, providing such blends, when comminuted, form a coke when heated to about 510° C. at a rate of about 2° C./min. Such coal blends may comprise coals that individually do not, when comminuted, form a coke when heated to about 510° C. at a rate of about 2° C./min. The coal should not be significantly oxidized or devolatized prior to use as such coals will not typically form a coke when heated to about 510° C. at a rate of about 2° C./min. Additionally, significant devolitalization or oxidation may inhibit or eliminate the carbon foam forming ability of the coal.

Figure 1:
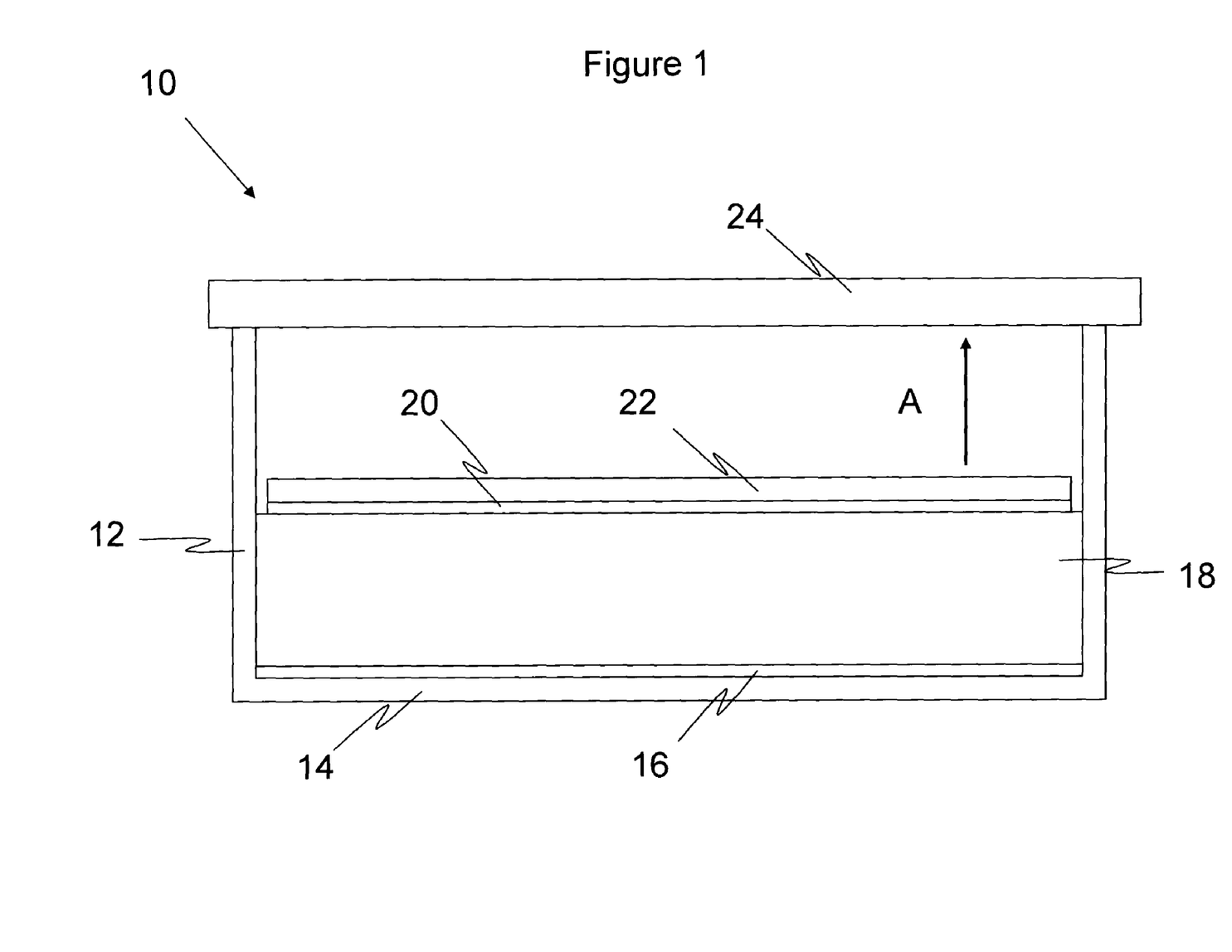
FIG. 1 is a cross-sectional representation of a container and associated optional features for forming carbon foam in accordance with an embodiment of the invention.

With reference now to FIG. 1, there is illustrated an embodiment of a foaming configuration 10. The process entails placing the comminuted coal 18 into a container 12. In some embodiments the container has a flat bottom 14. The container may utilize a lid 24. The optimum coal loading in the container is dependant, among other things, on the heat transfer characteristics of the container 10 and coal bed 18. Such optimum loadings may be determined by routine experimentation. For example, in some embodiments, containers having relatively long and wide flat bottoms may utilize coal loadings of about 14 g/in$^2$ of the container bottom surface area. In other embodiments, containers having relatively long and narrow flat bottoms may utilize coal loadings of greater than about 50 g/in$^2$ of the container bottom surface area.

The container may be fabricated from any material that is not significantly affected by the selected process conditions. Additionally, the container material(s) of construction may be such that they are not significantly wet by the plastic coal or significantly degraded by exposure to the coal or coal products at the selected process conditions. Furthermore, container material(s) of construction may be selected with respect to the thermal transport properties and/or dimensional stability of the material(s) of construction over the desired process conditions. Some suitable materials of construction of the container may include, but are not limited to, ceramic materials and metals, including aluminum, stainless steel, and nickel alloys.

In some embodiments, the container interior bottom surface is clean and smooth. Multiple uses of a given container may degrade the bottom interior container surface, due to, for example, the build-up of residues from previous foam production and exposure to the associated process conditions and gases. Such degradation may negatively impact the appearance, smoothness, and integrity of the bottom surface of the product carbon foam. The container bottom surface may be cleaned by conventional methods such as, but not limited to, washing, the use of abrasives, and the like. Alternatively, a clean metal foil or plate may be placed over the container bottom surface prior to the introduction of the coal. This thin metal foil or plate, which may be referred to as a bottom surface covering 16, may be perforated to provide for gas evolution from the bottom of the coal mass. In some embodiments, such perforations may be provided by a series of pin holes. As with the container bottom, such a metal foil or plate bottom surface covering may be cleaned as necessary to provide a clean and smooth surface for contact with the coal. In some embodiments, however, aluminum foil is used as the bottom surface covering. The use of aluminum foil may provide for a bottom surface covering that is low cost and economically disposable after each use, thus eliminating or reducing the need for cleaning of the container or bottom surface covering. Additionally, the use of such a metal foil, such as aluminum foil, may provide for easier extraction of the resultant carbon foam from the container.

In addition to metal foils and plates, other materials may be used as bottom surface coverings. In some embodiments these other materials may be perforated. Such other bottom surface covering materials may include non-porous or glazed ceramic plates, ceramic papers, or ceramic sheets, and the like. Other embodiments may include graphite foils or sheets. In general, suitable bottom surface covering materials may be sheet materials having at least one face exhibiting an essentially smooth surface. This essentially smooth surface is the surface of the bottom surface covering that typically is used to contact the coal bed. In some embodiments, suitable bottom surface covering materials may be capable of tolerating the process temperatures used in production of the carbon foam. Additionally, suitable bottom surface covering materials may be essentially non-reactive with the feedstock coal or any products thereof. Furthermore, it is generally desirous that the bottom surface covering may not be significantly wet by the feedstock coal when plastic. In some embodiments, the bottom surface covering may also not significantly absorb or adsorb the foaming feedstock coal. The bottom surface covering material in some embodiments may provide for good heat transport between the container bottom and the feedstock coal and resultant carbon foam. While not generally required to produce a carbon foam, it is generally advisable that the surface of the bottom surface covering which contacts the feedstock coal be substantially free from dirt, dust, debris, coal residues, and other contaminates prior to use.

Once placed in the container, in some embodiments, the comminuted coal may be uniformly distributed on the container bottom, or alternatively, the bottom surface covering, if utilized. The resulting coal bed may be compacted as desired. Compaction results in the densification of the bed of comminuted coal. Such densification may inhibit the formation of cracks, fissures, or void volumes on or within the carbon foam. Compaction may be accomplished by tamping, vibration, or the application of a force (i.e., a compaction force), to compact the comminuted coal particles. In some embodiments, the compaction force is not sufficient to cause the coal bed to become a self-supporting coherent mass. However, in other embodiments, the compaction force may be sufficient to cause the coal bed to become a self-supporting coherent mass. In those embodiments where a compaction force sufficient to cause the coal bed to become a self-supporting coherent mass is utilized, the coal may be compacted prior to introduction into the container.

In some embodiments, any of the same type of materials as used for bottom surface coverings may be optionally placed on the top surface of the coal bed. Such material, when applied in this manner, may be referred to as a top surface covering 20. For example, aluminum foil may be placed on the top surface of the coal bed, to provide a top surface covering. The useable types and desired characteristics of top surface coverings may be essentially the same as for bottom surface coverings. As with bottom surface coverings, top surface coverings may be perforated. In some embodiments, a top surface covering may provide for a more uniform foam top surface. In other embodiments, a top surface covering may also reduce or eliminate any non-foamed carbon material which sometimes forms on the top of the carbon foam. In still other embodiments, a top surface covering may serve to separate the resultant carbon foam from a coal cover.

In some embodiments, the top surface of the coal bed may be covered with a rigid sheet material, which may be referred to as a coal cover 22. Alternatively, the coal cover may be placed on top of a top surface covering, if present. The coal cover is not mechanically fixed to the container and is allowed to move with the contractions and expansions of the coal bed, carbon material, or foam. The coal cover may have at least one face having an essentially flat surface. In some embodiments, the essentially flat surface may be placed against the top of the coal feedstock bed, or, if present, the top surface covering. Coal covers may serve to apply a compressive force to the coal bed during processing of the coal bed to carbon foam. In some embodiments, the use of a coal cover may inhibit the formation of cracks, fissures, or void volumes on or within the carbon foam. For the purposes of this specification, cracks are separations between volumes of a piece of carbon foam wherein the cells of the foam bordering the crack are divided such that a portion of individual cells are present on both sides of the crack. Fissures are separations between volumes of a piece of carbon foam, wherein the internal cell volume of the cells comprising the walls are essentially not open to the fissure volume. Fissures typically extend from an outer volume of the carbon foam to an inner volume. Void volumes have essentially the same characteristics as fissures, except that void volumes do not typically extend to the surface of the carbon foam and are therefore internal to the as-produced carbon foam.

In some embodiments, suitable coal covers may be capable of tolerating the process temperatures and pressures used in production of the carbon foam. Additionally, the coal cover may be essentially non-reactive with the feedstock coal or any products thereof. Furthermore, the coal cover may be comprised of a material that is not significantly wet by, or absorbs, the feedstock coal, or any products thereof, including the resultant carbon foam, during processing. In some embodiments, the coal cover may provide for good heat transport between the atmosphere above the coal cover and the feedstock coal, or resultant carbon foam, under the coal cover. Suitable coal covers may comprise rigid sheet materials including, but not limited to, metal sheets and plates, non-porous or glazed ceramic plates or sheets, and the like. Other embodiments may include graphite sheets that satisfy the above discussed criteria as the rigid sheet material. In some embodiments, the smooth surface of the rigid sheet material should be substantially free from dirt, dust, debris, coal residues, and other contaminates prior to use. Suitable coal covers may include, but are not limited to, 1/16" thick aluminum plate, 1/8" thick aluminum plate, and about 0.070" thick 316 stainless steel sheet.

The compressive force exerted on the coal bed by the coal cover may be optimized. In some embodiments, such optimization may inhibit the development of cracks, fissures, or void volumes on or within the carbon foam. Factors that may limit the compressive force maximum may include practicality, container size, and heat transfer limitations. Additionally, the compressive force applied during the foaming process should not be so great as to cause the coal cover to be forced into the carbon foam. In some embodiments, effective compressive forces do not have to be large to show beneficial effects. For example, in some embodiments, forces as low as about 0.02 pounds per square inch of coal bed top surface area have been found to reduce the development of cracks, fissures, and voids and otherwise positively impact the formation of carbon foam. In further embodiments, forces of about 0.2 pounds per square inch have been found to reduce the development of cracks, fissures, and voids and otherwise positively impact the formation of carbon foam. The compressive force may be increased by increasing the mass of the coal cover. In most embodiments, increasing the mass of the coal cover increases its thickness, which in turn, as an undesired consequence, may lower its heat transfer ability. In some embodiments, the compressive force exerted on the coal bed by the coal cover may also be increased by the use of weights. A weight(s) may be placed on the upper surface, or connected to, the coal cover to further increase the compressive force. As desired, a weight may have projections, such as legs, so that the mass of the weight contributes to the compressive force exerted on the coal by the coal cover but does not significantly contact, or otherwise cover the surface of, the coal cover. By this and similar methods, the use of a weight may minimally impact the heat transfer between the atmosphere above the coal cover and the feedstock coal or resultant carbon foam under the coal cover.

In some embodiments, the compressive force exerted on the coal bed by the coal cover, including any weights, is not sufficient to prevent the coal from actualizing its foaming potential. In other embodiments, this compressive force is less than that force required to force the coal cover into the bed of forming carbon foam. In still other embodiments, this compressive force is not so great that the coal cover, and any associated weights, do not remain on the top surface of the resultant carbon foam.

In some embodiments, the container has a lid 24 which is placed on the container after loading of the comminuted coal and any of a bottom surface covering 16, top surface covering 20, and/or coal cover 22. Such lids may not provide for any appreciable pressure differential between the atmosphere inside the container and that outside the container. In some embodiments, the volatile material released by the coal may be retained, as much as possible, in the gas volume immediately surrounding the coal. The use of a lid on the container promotes this retention. Without intending to be bound by theory, it is believed that such retention promotes the swelling of the coal at elevated temperatures. In some embodiments, certain container designs not encompassing a lid may have a provision for retaining, at least for some period of time, the evolved volatile material in the gas volume (i.e. atmosphere) surrounding the coal. It is not required that the lid be mechanically fixed to the container. Further, the containers described herein allow for substantially free expansion during the formation of the carbon foam even when the containers are used in combination with one or more of a top surface cover, coal cover, or lid. While the weight of the top surface cover or coal cover may apply a force during the formation of the carbon foam, these features are not fixed thus allowing the carbon foam to expand, and increase in volume in at least one direction during foam formation. For example with reference to FIG. 2, there is an area above the top of the optional coal cover 22 which would allow for substantially free expansion of the carbon foam in the direction A.

In accordance with certain embodiments, the comminuted coal and container, including any of the above described optional surface covers, coal covers, weights, or lid, and the like, may then be heated to a first elevated temperature. In certain embodiments, heating may be conducted under an atmosphere that is essentially inert, non-oxidizing, or otherwise relatively non-reactive with the coal particles except for the gases or vapors evolved by the coal at elevated temperatures. Such an atmosphere may be partly or totally comprised of, for example, nitrogen, helium, neon, argon, xenon, carbon dioxide, or other essentially inert, non-oxidizing, or otherwise relatively non-reactive gases. In some embodiments, the pressure of the atmosphere surrounding the coal is essentially equal to about that of the ambient environment (0 psig). In other embodiments, the pressure may be higher. For example, the pressure may range from about ambient pressure to about 500 psig. In further embodiments, the pressure may be lower than that of ambient pressure. For example, in certain embodiments, the pressure may range from about 0 psi to about 0 psig (ambient pressure). Heating may be conducted in conventional furnaces and ovens having appropriate temperature operational ranges, a capability of maintaining an essentially inert atmosphere, and a tolerance to any process gases to which they may be exposed. Pressure vessels are not required, unless operating at pressures above or below ambient pressure.

The magnitude of the first elevated temperature is sufficient to cause the coal particles to become softened (i.e., plastic), at least partially melt (i.e., to become at least partially fluid), and intermix, where the individual coal particles substantially lose their individual characteristics and become substantially homogeneous with one another, thus forming a generally homogeneous, open cell plastic carbon material. The degree to which the coal particles lose their individual characteristics or identity by melting and intermixing to form a continuous, plastic, open cell carbon material, generally increases with increasing temperature to at least the first elevated temperature. In some embodiments, the resulting carbon foam may exhibit fewer, if any, fissures and internal voids as the degree to which the coal particles melt and intermix together increases. Therefore, in some embodiments, as high a first elevated temperature as possible, within the limits of control of the process, may be utilized. In some embodiments, the softened coal mass may be held at approximately the first elevated temperature for a period of time (i.e. a dwell time) sufficient to ensure that the coal particles have adequately melted and intermixed to form a substantially continuous, open cell plastic carbon material. The duration of such a period of time may be minimized as much as possible with respect to the production of carbon foam of good appearance and properties. Excessively long dwell times at or near the first elevated temperature may decrease the plastic properties of the open cell carbon material even to an extent where the material may no longer be capable of producing a carbon foam having a density less than about 1 g/cc. Therefore, in such instances of excessively long periods of time at or near the first elevated temperature, the resultant product may be carbon foam having a density greater than about 1 g/cc, which, in some embodiments, may be a high density carbon foam having a density greater than about 1 g/cc.

Optionally, in some embodiments, the coal bed may be heated at a relatively high (i.e. rapid) rate until some portion of the coal bed achieves a temperature sufficient for the coal to become just slightly softened. Such a heating rate may be about 5° C./min. From that initial elevated temperature to the first elevated temperature, heating may be performed at a reduced rate such that significant temperature gradients are not produced in the coal mass comprising the coal bed. In some embodiments, such a heating rate may be about 0.2° C./min. Without intending to be bound by theory, it is believed that the development of such gradients in the coal mass comprising the coal bed are usually to be minimized or avoided as they may lead to the development of fissures, voids, or other non-uniform properties, such as cell size, within the foam. Also, some furnaces may exhibit a tendency to overshoot (i.e. exceed) a desired set point temperature when heated using high heating rates. In such embodiments, slowing down of the heating rate starting at some temperature below the first elevated temperature may negate any adverse effects associated with such a tendency. The magnitude of suitable heating rates may be dependant on, for example, the size, shape, and the heat transfer characteristics of the coal bed and container. Suitable values of this heating rate may be determined by routine experimentation.

In some embodiments, the first elevated temperature may be approximately the "Initial Dilatation Temperature" as determined using an Arnu/Ruhr Dilatometer (ASTM D5515 "Standard Test Method for Determination of the Swelling Properties of Bituminous Coal Using a Dilatometer"). The value of the "Initial Dilation Temperature" is specific to each coal sample being tested. The process conditions to which the coal is subjected, and the particle size of the coal, may impact the temperature at which the optimum first elevated temperature is evident. Slow heating to the first elevated temperature may increase the value of this temperature to values above the "Initial Dilatation Temperature". Therefore, while values such as the "Initial Dilatation Temperature" may provide some guidance for selection or prediction of the optimum first elevated temperature, the process variables impact heavily on the value of the optimum first elevated temperature. As such, experimental investigations utilizing a specific feedstock coal and process condition range are recommended for establishment of the optimum first elevated temperature and other relevant process conditions. In some embodiments, the first elevated temperature may be above about 340° C. In other embodiments, the first elevated temperature may be a temperature within the range of about 340° C. to about 420° C.

As a result of achieving the first elevated temperature, and any residence time at or near that first elevated temperature, the coal particles are softened and melted together to form a substantially homogeneous open cell plastic carbon material. The substantially homogeneous open cell carbon material is then heated to a second elevated temperature. The second elevated temperature is greater than the first elevated temperature. As a result of this heating, the substantially homogeneous open cell plastic carbon material is progressively converted into a substantially homogeneous closed cell plastic carbon material. The substantially homogeneous closed cell plastic carbon material expands into a substantially closed cell plastic carbon foam. This substantially closed cell plastic carbon foam is then converted into a substantially homogenous open cell nonplastic carbon foam. In some embodiments, the second elevated temperature is that temperature at which the closed cell plastic carbon foam has expanded to an essentially maximum volume. That is, heating of the carbon foam to temperatures above this second elevated temperature produces no further substantial increase in the volume of the resultant carbon foam. In other embodiments, the second elevated temperature is that temperature at which the closed cell plastic carbon foam has expanded and formed an open cell nonplastic carbon foam.

The rate of heating from the first to the second elevated temperature may impact the volume occupied by, and density of, the resultant carbon foam. In some embodiments, the density of the resultant carbon foam may vary inversely with this heating rate. That is, slower heating rates between the first and second elevated temperatures may result in carbon foams having higher densities than those foams produced using faster heating rates. In some embodiments, the heating rate can be sufficiently slow as to produce high density carbon foams, wherein such high density carbon foams have a density greater than about 1 g/cc. Alternatively, faster heating rates between the first and second elevated temperatures may result in larger cell, and lower density, carbon foams. In some instances, even faster heating rates between the first and second elevated temperatures may result in the formation of coke rather than carbon foam.

In some embodiments, the heating rate from the first to the second elevated temperature may be less than about 1° C./min. In other embodiments, the heating rate from the first to the second elevated temperature may be less than about 0.5° C./min. In still other embodiments, the heating rate from the first to the second elevated temperature may be less than about 0.3° C./min.

For some embodiments, the value of the second elevated temperature may be dependant on the heating rate between the first and second elevated temperatures. Slower heating rates may depress the value of the second elevated temperature to lower temperatures. Conversely, faster heating rates may produce the opposite effect on the value of the second elevated temperature.

For some embodiments, the second elevated temperature may be from about 20° C. to about 70° C. greater than the first elevated temperature. Here again, the heating rate between the first and second elevated temperatures may have an impact upon the difference in temperature between the two values. Therefore, while values such as the "Initial Dilatation Temperature" can provide some guidance for selection or prediction of the optimum first and second elevated temperatures, various process variables impact heavily on the values of these elevated temperature. As such, experimental investigations utilizing a specific feedstock coal and process condition range are recommended for establishment of the optimum first and second elevated temperatures and other relevant process conditions.

Once the carbon material has achieved the second elevated temperature and is no longer plastic, the resulting mass is now the generally homogeneous open cell carbon material which is carbon foam. Such a carbon foam may be referred to as a green carbon foam as it has not yet been significantly carbonized. In some embodiments, this green carbon foam may be heated from the second elevated temperature to a third elevated temperature and maintained at that third elevated temperature for a time period that may be greater than about 2 hours. Such heating to, and at, a third elevated temperature may result in stronger carbon foam. In some embodiments, this third elevated temperature may be a temperature between about 450° C. and about 700° C. As desired, the resultant green carbon foam may be cooled to essentially ambient temperatures after heating to the second or third elevated temperature. The green carbon foam may then be subsequently heated to elevated temperatures as great as about 3000° C., or more, to provide a carbonized or graphitized carbon foam. Alternatively, after heating to the second, or third, elevated temperature the green carbon foam may be immediately heated to elevated temperatures greater than about 700° C. to provide a carbonized or graphitized carbon foam. Again, as desired, the resultant carbon foam may be cooled from such elevated temperatures to essentially ambient temperatures.

For either method, such heating may be conducted as a series of steps performed in one or more pieces of heating equipment. For example, the carbon foam may be formed in one furnace and subsequently carbonized in a second type of furnace, and exposed to graphitization temperatures in a third type of furnace. As an alternative example, the carbon foam may be formed, carbonized, and further heated, even to graphitization temperatures, in a single furnace.

For the purposes of this specification, the carbon foam will be considered not to be significantly carbonized, and to be green carbon foam, if only exposed to temperatures less than about 700° C. If exposed to temperatures greater than, or equal to, about 700° C., even to temperatures as great as about 3200° C. or higher, the carbon foam will be considered to be carbonized. Graphitization temperatures may be considered to be a subset of the range of carbonization temperatures and may extend from about 1700° C., up to about 3200° C. or higher. The carbon foam may be heated to temperatures in this range, even if the foam itself may not graphitize to any measurable extent.

In some embodiments, the strength of carbon foam, and other properties, may increase, or otherwise improve, with respect to the maximum elevated temperature to which the foam has been exposed. For some foams, such a maximum elevated temperature may be minimally about 900° C. Heating the foam to temperatures greater than about 1000° C. may further improve some properties of the carbon foam.

In some embodiments, heating and cooling of the carbon foam are conducted at rates such that undesired cracking, or other degradation, of the foam does not occur. Such cracking may result from the development of significant thermal gradients within the foam as a result of heating or cooling at high rates. Additionally, in some embodiments, heating of the coal, carbon material, or the resultant carbon foam is conducted under an atmosphere that is essentially inert, non-oxidizing, or otherwise relatively non-reactive with the coal particles, carbon material, or carbon foam except for the gases or vapors evolved by the coal, carbon material, or carbon foam. In a similar manner, in other embodiments, cooling of the carbon foam from elevated temperatures is conducted in a non-reactive, oxygen free, essentially inert atmosphere until the carbon foam temperature is minimally less than about 400° C. and more preferably less than about 150° C.

Figure 2:
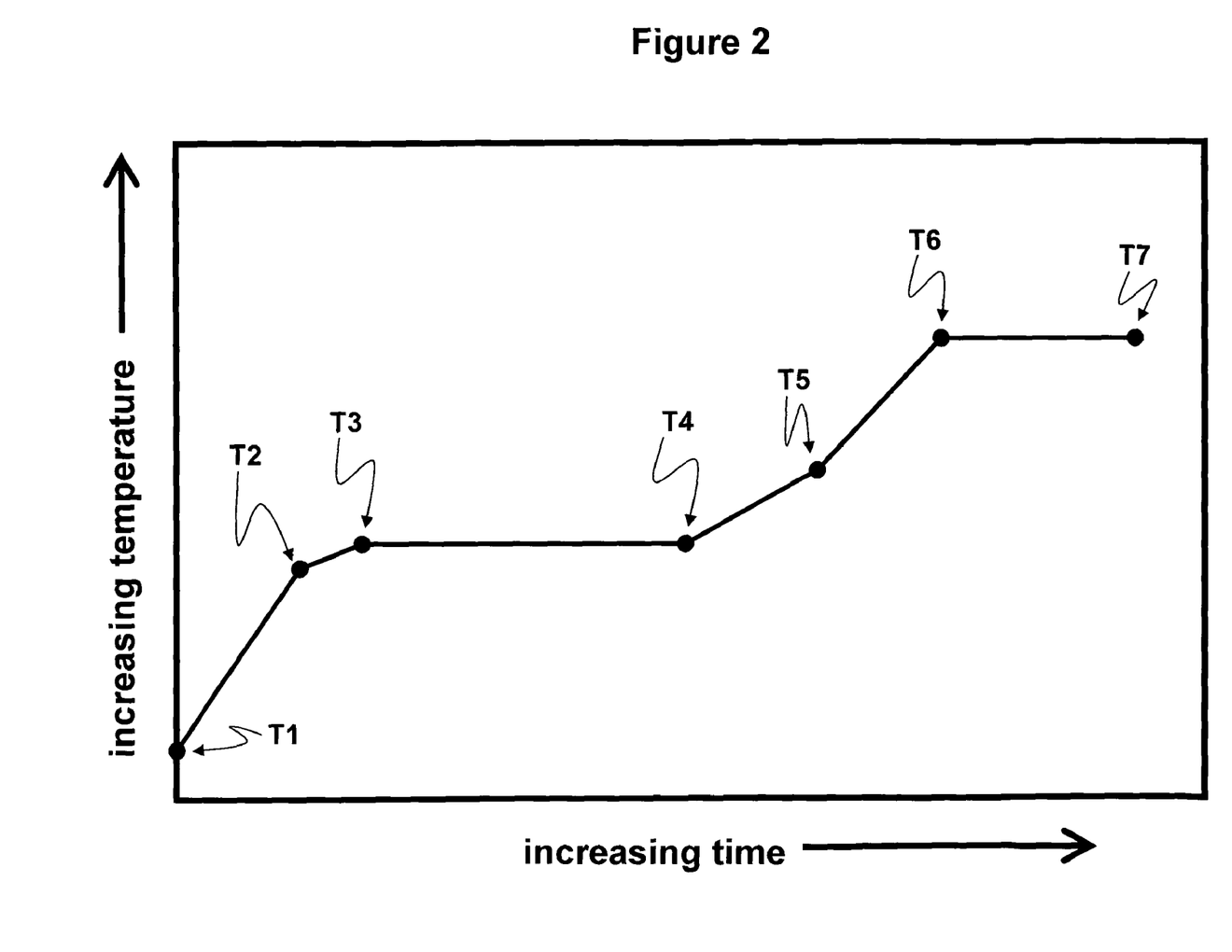
FIG. 2 illustrates a temperature profile in accordance with an embodiment for producing carbon foam.

An embodiment of a temperature program for the production of carbon foam from a suitable coal at atmospheric pressure is illustrated in FIG. 2. It should be noted that this Figure is for illustrative purposes only and is not to scale. As represented in this Figure, the container containing a suitable comminuted coal is heated from ambient temperature (T1) at an appreciable heating rate to an initial elevated temperature (T2). The heating rate may be a relatively rapid heating rate, such as about 5° C./min. The initial elevated temperature (T2) may be a temperature about 5° C. to about 20° C. less than the first elevated temperature (T3). The heating rate between elevated temperature (T2) and the first elevated temperature (T3) may be a relatively slow heating rate of about 0.2° C./min to about 0.3° C./min. Once the first elevated temperature (T3) has been achieved, the temperature may be held at a temperature (T4) essentially equal to the first elevated temperature (T3) for a period of time ranging from 0 to 3 or more hours.

In some embodiments, coals that do not readily develop internal voids within the body of the carbon foam during formation may utilize a time period of 0 hours between temperatures T3 and T4. In other embodiments, coals that may develop internal voids within the body of the carbon foam during formation may utilize a time period of ranging from greater than 0 to 3 or more hours between temperatures T3 and T4 to inhibit or eliminate such void formation. At the end of this time period, the temperature is increased from that temperature (T4), which may be essentially equal to the first elevated temperature (T3), to a second elevated temperature (T5) at a relatively slow rate of temperature increase. In some embodiments, this relatively slow rate of temperature increase may be about 0.5° C./min or less. In other embodiments, this relatively slow rate of temperature increase may be about 0.3° C./min or less. Optionally, the temperature could be maintained at the second elevated temperature (T5) for some period of time. However, in this illustration, the temperature is increased from the second elevated temperature (T5) to a third elevated temperature (T6) at a rate slightly faster than the rate of temperature increase between that temperature (T4) at or near the first elevated temperature (T3) to the second elevated temperature (T5). Such a slightly faster rate of temperature increase may be about 0.5° C./min. The third elevated temperature (T6) may be a temperature between about 450° C. and about 500° C., or a higher temperature. Once the third elevated temperature (T6) has been achieved, the temperature may be held at a temperature (T7) at or near the third elevated temperature (T6) for a period of time ranging from about 0 to about 6 or more hours. For many embodiments, a time period of about 3 hours is adequate to result in green carbon foam having acceptable strength. At the end of this time period, as described above, the resultant carbon foam may be cooled to essentially ambient temperatures. The green carbon foam may then be subsequently heated to elevated temperatures as great as about 3000° C. or more. Alternatively, after heating to the second (T5) or third elevated temperature (T6) the green carbon foam may be immediately heated to elevated temperatures as great as about 3000° C. or more.

In other embodiments, again referring to FIG. 1, the container containing a suitable comminuted coal may be continuously heated from ambient temperature (T1) to a third elevated temperature (T6) at a constant heating rate. The constant heating rate may be a heating rate suitable for heating from the first elevated temperature (T3 and/or T4) to the second elevated temperature (T5). Such an embodiment is advantageous as values for the first and second elevated temperatures do not have to be determined. However, such embodiments may have potentially negative aspects associated with them. For example, a continuous slow heating rate between ambient temperature (T1) and the third elevated temperature (T6) may negatively impact the foam forming ability of the coal undergoing processing. Additionally, use of slow heating rates over temperature ranges, where such slow rates are not necessary for the development of acceptable product (i.e. carbon foam) properties, results in unnecessarily long processing times. Such unnecessarily long processing times may have numerous negative economic consequences and are typically to be avoided. Conversely, it some embodiments, it is therefore economically advantageous to reduce to required processing time as much as possible while still providing for an acceptable product.

The following examples are provided to illustrate certain aspects of certain embodiments for producing carbon foam. The scope of the invention should not be limited to the particular embodiments provided in the Examples.

EXAMPLE 1

Three bituminous coals, identified as coals A, B, and C and having the properties listed in Table I, were comminuted to a mesh size of nominally less than about 140 mesh (U.S. Standard Sieve Series). Portions of each coal were placed in respective flat bottom containers. The resulting coal bed in each container was then compacted in the container by dropping the respective container a number of times from the height of a few inches. The amount of coal placed in each container was sufficient to provide a coal loading of about 14 g per square inch of the container bottom surface area. For all coals, a 0.002" thick aluminum foil sheet, perforated with a number of pin holes, was placed on the bottom of the container prior to introduction of the coal. Also for all coals, a 0.002" thick aluminum foil sheet was placed on the top of each coal bed. For coals A and B, this top aluminum foil sheet was perforated with a number of pin holes. An aluminum plate was then placed on top of the aluminum foil covering the top of the coal bed for each sample. For coal A, this aluminum plate provided a compressive force of about 0.024 lb/in$^2$. For coals B and C, this aluminum plate provided a compressive force of about 0.020 lb/in$^2$. Lids were then placed on the containers.

TABLE I

Properties of selected comminuted coals.

| Property | Coal A | Coal B | Coal C |
|---|---|---|---|
| Volatile Material (%, dry) | 23.7 | 37.3 | 29.9 |
| Ash (%, dry) | 5.4 | 8.0 | 2.6 |
| Residual Moisture (%) | 0.44 | 1.41 | 0.82 |
| Volatile Material (%, dry, ash free) | 25.0 | 40.5 | 30.7 |

Containers prepared as described for each coal were subsequently heated in a furnace under essentially inert conditions. The furnace was programmed to heat at a rate of 2° C./min from room temperature to those maximum treatment temperatures listed in Table II. Upon achieving maximum temperature, the furnace was programmed to remain at that maximum temperature for a time period of 3 hours. Following this time period, the furnace was cooled to about room temperature. All heating and cooling of the containers was conducted in an atmosphere having a pressure of about 0 psig, and that was essentially inert, oxygen free, or otherwise non-oxidizing. After cooling, the contents of each container were examined. The results of this examination are provided in Table II.

TABLE II

Descriptions of the products obtained by heating selected comminuted coals by the method given in Example 1.

| Maximum Treatment Temperature (° C.) | Product Description | | |
|---|---|---|---|
| | Coal A | Coal B | Coal C |
| 510 | Highly expanded coke | Coke | Highly expanded coke |
| 470 | Highly expanded coke | Coke | Highly expanded coke |
| 430 | Coke | Borderline coke/carbon foam | Coke |
| 370 | Soft, partially agglomerated powder | High density carbon foam | Partially agglomerated powder |

Examination of Table II shows that all of the coals produced cokes when exposed to maximum treatment temperatures of about 510° C. and about 470° C. When exposed to maximum treatment temperature of about 430° C., coals A and C produced coked materials. At this treatment temperature, coal B produced a product that could not be described as being completely a coke or a carbon foam but was somewhat on the borderline between the two materials. When exposed to a maximum treatment temperature of about 370° C., coals A and C produced products that were comprised of partially agglomerated powder. This powder was the product of heating the coals to about 370° C. It is apparent that a temperature of about 370° C. is not sufficient for these coals to become significantly plastic. On the other hand, a temperature of about 370° C. was sufficient for the particles of coal B to soften, melt together, and form a generally homogeneous dense open cell carbon material, in this case a high density carbon foam, that was at least for some time slightly plastic during its formation.

This example demonstrates that comminuted coals A, B, and C are all capable of forming a coke when heated to a temperature of about 510° C. at a rate of about 2° C./minute. This example also indicates that coals A and C have higher tendencies to form coke than does coal B. That is, coals A and C may be considered to have greater plastic properties than does coal B.

EXAMPLE 2

The value of the first elevated temperature, as discussed above, was determined in the following manner for coals A, B, and C. Containers containing coals A, B, and C were prepared as described in Example 1. These containers were heated in a furnace programmed to heat at a rate of 5° C./min to an initial given temperature followed by heating at a rate of 0.25° C./min to a temperature 10° C. higher than the initial temperature. The furnace temperature was maintained at this higher temperature for a time period of 8 hours. Following this time period, the furnace was cooled to ambient temperatures.

With respect to FIG. 1, this furnace heating profile could be described as heating from ambient temperature (T1) to an elevated temperature (T2) at a rate of 5° C./min, followed by heating to a higher temperature (T3, where T3=T2+10° C.) at a rate of 0.25° C./min. The maximum temperature (T3) was maintained for a time period of essentially 8 hours, as represented in FIG. 1 by T4, where T4 essentially equals T3. The furnace was cooled to ambient temperatures following this time period. All heating and cooling of the containers was conducted in an atmosphere having a pressure of about 0 psig, and that was essentially inert, oxygen free, or otherwise non-oxidizing.

After cooling, the content of each container was examined to determine the maximum temperature or temperature range sufficient to result in the coal particles softening and melting together to form a substantially homogeneous open cell plastic carbon material. In other words, the contents were examined to determine the approximate maximum temperature at which high density carbon foams of good quality may be produced. This temperature is then approximately the first elevated temperature, as previously discussed. For coal A, the first elevated temperature was found to be about 380° C. For coals B and C, the first elevated temperature was found to be about 370° C.

EXAMPLE 3

Suitable rates for the heating of coals A, B, and C from the first elevated temperature to the second elevated temperature to result in the formation of carbon foam, as discussed above, were determined in the following manner. Containers containing coals A, B, and C were prepared as described in Example 1. These containers were heated in a furnace programmed to heat at a rate of 5° C./min to a temperature about 10° C. lower (about 5° C. lower in the case of coal A) than the first elevated temperature, followed by heating at a given constant rate, which will be referred to as R, to a temperature of 470° C. (coals B and C) or 475° C. (coal A). The furnace temperature was maintained at this higher temperature for a time period of 3 hours. Following this time period, the furnace was cooled to ambient temperatures. All heating and cooling of the containers was conducted in an atmosphere having a pressure of about 0 psig, and that was essentially inert, oxygen free, or otherwise non-oxidizing.

With respect to FIG. 1, this heating profile could be described as heating from ambient temperature (T1) to an initial elevated temperature (T2) at a rate of 5° C./min. This elevated temperature (T2) was about 10° C. lower (about 5° C. lower in the case of coal A) than the first elevated temperature (T3). Heating was continued at a given constant rate, which will be referred to as R, through the temperature range encompassing temperatures T3, T4 and T5 to the third elevated temperature (T6). It was assumed that the selected value for T6 was significantly greater than the actual value of the second elevated temperature (T5). The maximum temperature (T6) was maintained for a time period of essentially 3 hours, as represented in FIG. 1 by T7, where T7 essentially equals T6. The furnace was cooled to ambient temperatures following this time period. All heating and cooling of the containers was performed under essentially inert, or otherwise oxygen free, conditions. It should be noted that, in this example, the time period between T3 and T4 is 0 hours and that T3 equals T4. It should also be noted that the constant rate of temperature increase between temperatures T2 and T3 is equal to the rate of temperature increase between temperatures T4 and T5 and between temperatures T5 and T6, and therefore equal to the rate of temperature increase between temperatures T3 (or T4) and T6. In this example, the value of the second elevated temperature is not yet known. But, it is known that the second elevated temperature may be 20° C. to 70° C. higher than the first elevated temperature. Therefore by heating to a temperature (T6) 95° C. to 100° C. higher than the initial elevated temperature (T2), it is typically ensured that the second elevated temperature (T5) has been achieved by the furnace.

After cooling, the contents of each container were examined. The results of this examination are provided in Table III. Examination of Table III shows that coal C produced a coke when heated at rates greater than or equal to 0.4° C./min, while coals A and B produced cokes when heated at rates greater than or equal to 0.3° C./min. At lower rates, these coals produced carbon foams. Therefore, the maximum heating rate between the first and second elevated temperatures is less than about 0.4° C./min and greater than about 0.3° C./min for coal C and less than about 0.3° C./min and greater than about 0.2° C./min for coals A and B. Further experimentation, using heating rates between the limits for each coal, may define these maximum rate values to a higher degree of precision. It should also be noted that the cell size of the carbon foam products generally decrease with decreasing heating rate. In some embodiments, high density carbon foams can be produced by use of suitably slow heating rates.

TABLE III

Description of the products obtained by heating comminuted coals at selected rates (R) between the temperatures T3 and T6 by the methods given in Example 3.

| R Heating Rate (° C./min) | Product Description | | |
|---|---|---|---|
| | Coal A | Coal B | Coal C |
| 2 | Highly expanded coke | — | Highly expanded coke |
| 1 | Highly expanded coke | Coke | Highly expanded coke |
| 0.75 | Highly expanded coke | Coke | Highly expanded coke |
| 0.5 | Highly expanded coke | Coke | Coke |
| 0.4 | Coke | Coke | Coke |
| 0.3 | Small cell coke | Borderline coke/carbon foam | Small to large cell carbon foam |
| 0.2 | Small to large cell carbon foam | Small to medium cell carbon foam | Small to medium cell carbon foam |
| 0.1 | Small to medium cell carbon foam | Small cell carbon foam | Small to medium cell carbon foam |
| 0.05 | Fine to medium cell carbon foam | — | — |

EXAMPLE 4

An approximate value for the second elevated temperature for a heating rate of about 0.1° C./min was determined for coal A in the following manner. Containers of coal A were prepared as described in Example 1. These containers were heated in a furnace programmed to heat at a rate of 5° C./min from ambient temperature to 375° C., which is a temperature about 5° C. lower than the first elevated temperature of about 380° C. The containers were then heated from 375° C. to 415° C. at a rate of about 0.1° C./min, followed by heating at a rate of 0.5° C./min from 415° C. to 475° C. The furnace temperature was maintained at 475° C. for a time period of 3 hours. Following this time period, the furnace was cooled to ambient temperatures. All heating and cooling of the containers was performed under essentially inert, or oxygen free or otherwise non-oxidizing, conditions. Examination showed the carbon foams produced using this heating program were essentially equivalent to those produced from coal A in Example 3 using a heating rate of 0.1° C./min. Example 3 also shows that heating coal A at a rate of 0.5° C./min results in a coke product. In this example, the use of 415° C. as a second elevated temperature did not impact the appearance of the product carbon foam. Therefore, the second elevated temperature is a temperature less than or equal to about 415° C.

Additional containers of coal A were prepared as described in Example 1. These containers were heated in a furnace programmed to heat at a rate of 5° C./min from ambient temperature to 375° C., which is a temperature about 5° C. lower than the first elevated temperature of about 380° C. The containers were then heated from 375° C. to 405° C. at a rate of about 0.1° C./min, followed by heating at a rate of 0.5° C./min from 405° C. to 475° C. The furnace temperature was maintained at 475° C. for a time period of 3 hours. Following this time period, the furnace was cooled to ambient temperatures. All heating and cooling of the containers was conducted in an atmosphere having a pressure of about 0 psig, and that was essentially inert, oxygen free, or otherwise non-oxidizing. Examination showed the carbon foams produced using this heating program exhibited larger cell sizes than did those carbon foams previously produced in this example. The cell sizes of the foams produced using a rate change at 405° C. exhibited cell sizes larger than those produced from coal A in Example 3 using a heating rate of 0.1° C./min. Example 3 also shows that heating coal A at a rate of 0.5° C./min results in a coke product. In this example, the use of 405° C. as a second elevated temperature did impact the appearance of the product carbon foam. Therefore, the second elevated temperature for coal A is a temperature greater than about 405° C. and less than or equal to about 415° C. Further experimentation, using temperatures between these limits may define the second elevated temperature to a higher degree of precision.

In like manner the second elevated temperature for coal B, at a rate of 0.2° C./min was found to be less than or equal to about 400° C. The second elevated temperature for coal C, at a rate of 0.2° C./min was found to be greater than about 400° C. less than or equal to about 410° C.

EXAMPLE 5

Coals A, B, and C, having the properties listed in Table 1, were comminuted to mesh sizes of nominally less than about 140 mesh (U.S. Standard Sieve Series). Portions of these coals were placed in flat bottom containers. The amount of coal placed in each container was sufficient to provide a coal loading of about 14 g per square inch of the container bottom surface area. Lids were then placed on the containers.

The containers containing coal A were heated in a furnace programmed to heat from ambient temperature to 375° C. at a rate of 5° C./min, then from 375° C. to 415° C. at a rate of 0.1° C./min, and finally from 415° C. to 475° C. at a rate of 0.5° C./min. The furnace was maintained at 475° C. for a time period of 3 hours. Following this time period, the containers were cooled to essentially ambient temperature. All heating and cooling of the containers was conducted in an atmosphere having a pressure of about 0 psig, and that was essentially inert, oxygen free, or otherwise non-oxidizing.

The containers containing coal B were heated in a furnace programmed to heat from ambient temperature to 360° C. at a rate of 5° C./min, and then from 375° C. to 470° C. at a rate of 0.15° C./min. The furnace was maintained at 470° C. for a time period of 3 hours. Following this time period, the containers were cooled to essentially ambient temperature. All heating and cooling of the containers was performed under essentially inert, or otherwise oxygen free, conditions.

The containers containing coal C were heated in a furnace programmed to heat from ambient temperature to 360° C. at a rate of 5° C./min, then from 360° C. to 420° C. at a rate of 0.2° C./min, and finally from 420° C. to 470° C. at a rate of 0.5° C./min. The furnace was maintained at 470° C. for a time period of 3 hours. Following this time period, the containers were cooled to essentially ambient temperature. All heating and cooling of the containers was performed under essentially inert, or otherwise oxygen free, conditions.

Examination of the containers showed that all the coals produced carbon foams under the given conditions. The body of those foams prepared using all three coals were somewhat misshapen and internally exhibited small to medium cell sizes. Additionally, the top surface of body of those foams prepared from coal B exhibited a few fissures along with some pulverized unfoamed coal.

Therefore, this example demonstrates that it is possible to use the teachings of this specification to prepare carbon foams from coals at atmospheric pressure without the use of coal covers, top surface coverings, or bottom surface coverings. This example also demonstrated that the use of coal covers, top surface coverings, or bottom surface coverings may improve the appearance of the as-produced carbon foam body.

As the invention has been described with respect to certain embodiments, it will be apparent to those skilled in the art that the same may be varied in many ways without departing from the spirit and scope of the invention. Any and all such modifications are intended to be included within the scope of the appended claims.

What is claimed is:

1. A method for producing carbon foam, the method comprising the steps of:
    heating comminuted coal that has not been devolatized or subjected to oxidizing pre-treatment to a first elevated temperature sufficient to form a substantially homogeneous, plastic, open cell carbon material, wherein said comminuted coal forms a coke when heated to about 510° C. at a rate of about 2° C./min; and
    heating said substantially homogeneous, plastic, open cell carbon material to a second elevated temperature sufficient to form a carbon foam, wherein the carbon foam is substantially free to expand in at least one direction during formation, and wherein said method is conducted at about 0 psig.

2. The method of claim 1, wherein said heating is conducted in a substantially non-oxidizing atmosphere.

3. The method of claim 1, wherein said second elevated temperature is a temperature at which the carbon foam has expanded to an essentially maximum volume and formed an open cell, nonplastic, carbon foam.

4. The method of claim 1, further comprising the step of heating of said carbon foam to a third elevated temperature, wherein said third elevated temperature is a temperature greater than said second elevated temperature.

5. The method of claim 4, wherein said third elevated temperature is a temperature greater than about 450° C. and less than about 700° C.

6. The method of claim 4, wherein said third elevated temperature is a temperature greater than about 700° C.

7. The method of claim 4, further comprising the step of heating of said carbon foam to a temperature greater than said third elevated temperature.

8. The method of claim 1, wherein said first elevated temperature is above about 340° C.

9. The method of claim 1, wherein said second elevated temperature is at least about 20° C. greater than said first elevated temperature.

10. The method of claim 1, further comprising the steps of:
    placing comminuted coal in a container to form a coal bed; and
    positioning a coal cover on a top surface of the coal bed.

11. A method for producing carbon foam, the method comprising the steps of heating comminuted coal that has not been devolatized or subjected to oxidizing pre-treatment to a temperature and at a rate sufficient to form carbon foam having a density ranging from about 0.1 to about 0.8 g/cc, wherein said heating is conducted in an essentially inert atmosphere having a pressure of about 0 psig, wherein said comminuted coal forms a coke when heated to about 510° C. at a rate of about 2° C./min, and wherein said carbon foam is substantially free to expand in at least one direction during formation of carbon foam.

* * * * *